United States Patent
Haupt et al.

(10) Patent No.: US 7,967,713 B2
(45) Date of Patent: Jun. 28, 2011

(54) PLANETARY TRANSMISSION

(75) Inventors: Josef Haupt, Tettnang (DE); Paul Granderath, Ravensburg (DE); Hagen Dopfert, Lindau (DE); Christian Ruhl, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 233 days.

(21) Appl. No.: 12/413,886

(22) Filed: Mar. 30, 2009

(65) Prior Publication Data

US 2009/0247348 A1    Oct. 1, 2009

(30) Foreign Application Priority Data

Apr. 1, 2008  (DE) .................. 10 2008 000 900

(51) Int. Cl.
  *F16H 57/04*    (2010.01)
(52) U.S. Cl. .......................... 475/160; 74/467
(58) Field of Classification Search .............. 475/159, 475/160, 331, 348; 74/467
  See application file for complete search history.

(56) References Cited

U.S. PATENT DOCUMENTS

| | | | |
|---|---|---|---|
| 4,968,157 A | 11/1990 | Chiba | |
| 5,910,062 A | 6/1999 | Mizuta | |
| 5,910,063 A | 6/1999 | Kato | |
| 7,097,582 B2 | 8/2006 | Bauknecht et al. | |
| 7,422,540 B2 | 9/2008 | Neudecker et al. | |
| 2007/0010365 A1 | 1/2007 | Schmitt | |
| 2007/0111846 A1 | 5/2007 | Metten et al. | |

FOREIGN PATENT DOCUMENTS

| | | |
|---|---|---|
| DE | 19731746 A1 | 2/1998 |
| DE | 19736686 A1 | 3/1998 |
| DE | 19731746 A1 | 8/1998 |
| DE | 10221097 A1 | 11/2003 |
| DE | 10309666 A1 | 12/2004 |
| DE | 102005031592 A1 | 1/2007 |
| DE | 102005054084 A1 | 7/2007 |

*Primary Examiner* — Justin Holmes
(74) *Attorney, Agent, or Firm* — Davis & Bujold, P.L.L.C.

(57) ABSTRACT

A planetary gear set lubricating unit which supplies oil from inside a component adjacent the planetary gear set, via a radial bore and an oil catcher, axially through a bore of a planetary gear bolt to planetary gear bearings. The oil catcher forms a ring-shaped chamber, which can be filled with lubricant, and is arranged beside the planetary carrier approximately over the reference diameter of the planetary bolt. The oil catcher has outlet pipes extending axially to direct oil in the chamber. The oil catcher has ovular radial protrusions arranged such that a maximum radial dimension is close to the bolts and a minimum radial dimension is arranged between adjacent planetary bolts. The radially inner edge of the axial bore of the planetary bolts is radially located between the minimum and maximum dimensions of the protrusions. The chamber is delimited by a cover plate and a gasket.

9 Claims, 4 Drawing Sheets

PLANETARY TRANSMISSION

This application claims priority from German Application Serial No. 10 2008 000 900.8 filed Apr. 1, 2008.

FIELD OF INVENTION

The invention concerns a planetary transmission with at least one planetary gear set having a planetary carrier and planetary gears rotatably mounted on planetary bolts, which are axially introduced into the planetary carrier, with a component adjacent to the planetary gear set, which does not have a relative speed with respect to a planetary carrier of the planetary gear set, as well as with a lubricating unit for supplying a lubricant to the planetary gears and their bearing.

BACKGROUND OF THE INVENTION

Many different planetary gears with one or several links are known from the state of the art. For lubrication and cooling of the planetary gears of the individual planetary gear sets of such planetary gears, it is generally known how to provide each of the bolts of the planet gears with lubricant bores—usually with a central bore and one or several radial bores—and to direct the lubricant via these lubricant bores to the bearing as well as to the gear tooth system of the respective planetary gears. For this purpose, the lubricant made available by a hydraulic system is usually guided, via a central shaft of the planetary transmission and suitably configured radial bores of this central shaft, into an area near the individual planetary gear sets, preferably into an area directly beside the respective planetary gear set, in such a way that the lubricant can flow by the respective planetary gear set in a radial direction as a consequence of the effect of the centrifugal force. Lubricant catchers, which are preferably mounted radially above the bolt on the planetary carrier of the respective planetary gear set, are usually provided to collect this radially inflowing or spraying lubricant in the region of the bolt of the respective planetary gear set. The lubricant collected in this way moves then easily in the lubricant bores of the bolts of the respective planetary gear sets and subsequently at the bearing and gear tooth system of the planet gears as a consequence of the effect of the centrifugal force of the inflowing lubricant.

Several structural examples for supplying lubricant to the planetary gears of a planetary gear set are known from DE 102 21 097 A, especially for a planetary gear set whose planetary carrier does not have a relative speed with respect to the adjacent component. A static seal, preferably by means of an O-ring, can be arranged instead of the lubricant catcher between the planetary carrier and the adjacent component connected to the planetary carrier in such a way, that a radially extending section of the planetary carrier and a radially extending section of the adjacent component jointly form a collection chamber in which the lubricant fed from the central shaft is collected and is fed from there to the lubricant bores of the planetary bolts.

It has been shown in the practice, that the operation at high speeds can be problematic with a lubricant supply to a planetary gear set that uses a lubricant catcher. Especially under the influence of the very high speeds of the planetary carrier, only part of the available lubricant reaches the intended lubricating points, since the lubricant or the lubricant mist flows past the lubricant catcher, when the planetary carrier speed increases and the lubricant catcher increasingly backflushes. The lubricant is no longer distributed evenly at the periphery in the lubricant catcher, when the planetary carrier speed increases and is also no longer distributed in the same proportions to the individual planetary bolts.

SUMMARY OF THE INVENTION

For this reason, it is an object of the invention to create a planetary transmission with at least one planetary gear set and a component adjacent to this planetary gear set based on the mentioned state of the art, which does not have a relative speed with respect to the planetary carrier of this planetary gear set, in which the lubricant supplied to the planetary gear set is also reliably evenly distributed to all planetary bolts of the planetary gear set even at high planetary carrier speed.

The invention can be applied to all planetary gear sets of a planetary transmission in which the respective planetary carrier does not have a relative speed with respect to the adjacent component and in which the lubricant required for the lubrication and cooling of the bearing and gear tooth system of the planetary gears is fed from this adjacent component.

The planetary transmission according to the invention comprises at least one planetary gear set with a planetary carrier and planetary gears, which are rotatably mounted on planetary bolts inserted axially into the planetary carrier. The planetary transmission according to the invention also comprises a component adjacent to the planetary gear set—configured, for example, as a shaft or hub—which does not have a relative speed with respect to a planetary carrier of the planetary gear set. A lubricating unit having the following special feature combination is provided according to the invention for supplying lubricant to the planetary gears and their bearing:

The supply of lubricant comes from radially inside via at least one radial bore of the component adjacent to the planetary gear set, which does not have a relative speed with respect to the planetary carrier;

The lubricant supply is directed from the radial bore of the component adjacent to the planetary gear set via a lubricant catcher arranged on the side of the planetary carrier axially into an axial bore of the respective planetary gear bolt and from there via at least one radial bore (arranged preferably radially outside) of the respective planetary bolt to the radial bearing of the respective planetary gears and from there via thrust washers arranged to the left and right of the planetary gears to the gear tooth system of the planetary gears;

The lubricant catcher is connected to the planetary carrier in a rotationally fixed manner;

The lubricant catcher has a hood-shaped outer contour for forming a ring-shaped chamber arranged on the side of the planetary carrier over approximately the reference diameter of the planetary bolt which can be filled with lubricant from radially inside;

The lubricant catcher has exactly as many outlet pipes in an axial extension as there are planetary bolts, whereby these outlet pipes feed axially into the ring-shaped chamber of the lubricant catcher and are introduced into the axial bores of the planetary bolts, when they are installed to divert and feed forward the lubricant fed to the lubricant catcher;

The hood-shaped outer contour of the lubricant catcher has exactly as many radial outwardly directed oval protrusions as there are planetary bolts, whereby these oval protrusions are arranged in such a way in the circular pitch of the planetary bolts seen from a spatial point of view, that the maximum radial extension of the oval protrusions is arranged near the planetary bolt, and the minimum radial extension of the oval protrusions is arranged between the two adjacent planetary bolts, whereby the radial inner edge of the axial bore of the planetary bolts is located in a region radially between the minimum and maximum radial extension of the respective oval protrusion of the lubricant catcher;

The ring-shaped chamber of the lubricant catcher is delimited at its side which faces away from the planetary carrier by means of a cover plate with an at least approximately circular inner diameter which is smaller than the minimum radial extension of the oval protrusions of the lubricant catcher;

The ring-shaped chamber of the lubricant catcher is delimited at its side which faces toward the planetary carrier by means of a gasket with a preferably circular inner diameter which is smaller than the inner diameter of the cover plate of the lubricant catcher.

In one embodiment of the invention, it is proposed to arrange an axial bearing in the direction of flow of the lubricant between the radial bore of the component arranged adjacent to the planetary gear set which does not have a relative speed with respect to the planetary carrier of the planetary gear set and the lubricant catcher, as seen from a spatial point of view, below the lubricant catcher and axially between the planetary carrier, and an assembly that is likewise adjacent to the planetary carrier, but which can be rotated at a relative speed with respect to the planetary carrier of the planetary gear set. The following is provided for the supply of lubricant:

The axial bearing has a bearing washer on its side that faces toward the planetary carrier whose outer diameter is greater than the inner diameter of the gasket of the lubricant catcher;

The outer edge of the bearing washer formed by the outer diameter of the bearing washer is axially arranged when installed, as seen from a spatial point of view, between the gasket and the cover plate of the lubricant catcher in axial proximity to the gasket, with a radial cover between the outer diameter of the bearing washer and the inner diameter of the gasket of the lubricant catcher;

The axial bearing has an angle disk with a radial section angled transversely and arranged above the rolling element of the axial bearing on its side facing away from the planetary carrier and a plate-shaped section that attaches to this transversely angled section, whereby this plate-shaped section of the angle disk constitutes its outer diameter, which is smaller than the inner diameter of the cover plate of the lubricant catcher;

The plate-shaped section of the angle disk is arranged axially between the gasket and the cover plate of the lubricant catcher when installed, as seen from a spatial point of view, and is arranged axially at a distance from the cover plate in such a way, that the axial distance between the plate-shaped section of the angle disk and the gasket is smaller than the axial distance between the disk-shaped section of the angle disk and the cover plate; and The lubricant is guided axially between the bearing washer and the angle disk radially through the axial bearing.

In another embodiment of the invention, it is proposed to arrange in the direction of flow of the lubricant between the radial bore of the component adjacent to the planetary gear set which does not have a relative speed with respect to the planetary carrier and the previously described axial bearing—configured in particular as a hub—a cylinder-shaped assembly which is likewise positioned adjacent to the planetary carrier but which can be rotated at a relative speed with respect to the planetary carrier. The following is provided for the supply of lubricant:

The cylinder-shaped assembly covers the radial bore of the component adjacent to the planetary gear set in an axial direction and has a step on its inner diameter in the region of this axial cover which forms a ring-shaped collection chamber for collecting and distributing the lubricant fed radially from inside;

and the cylinder-shaped assembly has cage-shaped recesses in an axial extension positioned to be distributed over the periphery of its inner diameter on its face that faces toward the planetary carrier in the region of the step, and these recesses feed into the collection chamber and swirl the lubricant fed into the collection chamber, when it is radially conducted onward.

The lubricant catcher can be made of plastic as well as also of rolled metal sheets.

BRIEF DESCRIPTION OF THE DRAWINGS

The invention will be explained in greater detail below with reference to the enclosed figures, whereby identical assemblies have been provided with the same reference characters, and in which.

DETAILED DESCRIPTION OF THE INVENTION

Figure 1:
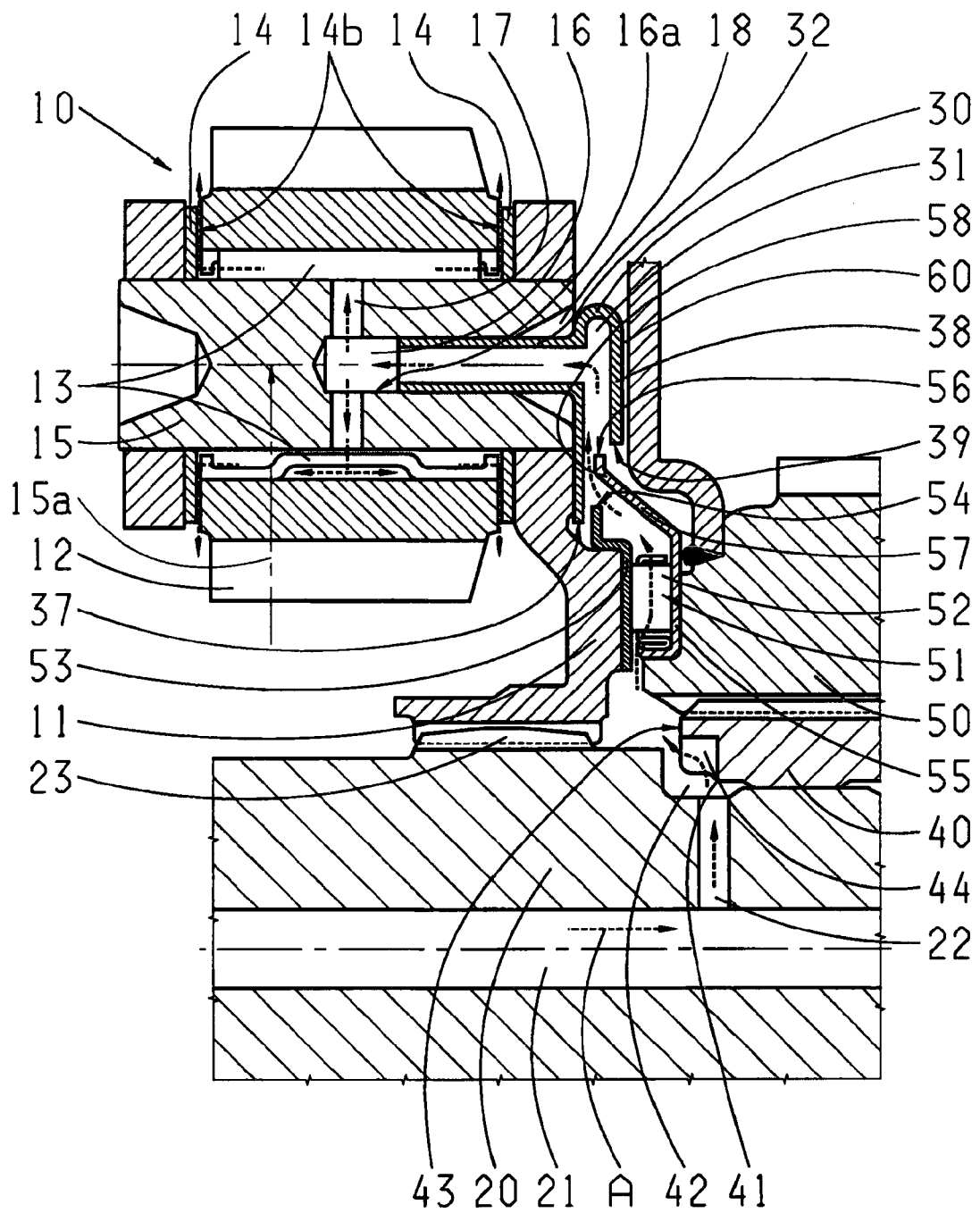
FIG. 1 shows a sectional view of an exemplary planetary transmission according to the invention.

The exemplary planetary transmission according to the invention shown in FIG. 1 in a sectional view comprises a planetary gear set 10 with a planetary carrier 11, with planetary bolts 15 introduced into planetary carrier 11 and axially distributed over its periphery, as well as planetary gears 12 rotatably mounted on the planetary bolt 15. Needle sleeves, for example, can be provided in a known manner as radial planetary bearing 13, and thrust washers can be provided in a known manner as axial planetary gear bearing 14. In order to distribute the lubricant to the radial and axial planetary gear bearings 13, 14, it is known how to provide the individual planetary bolts 15 with an axial bore 16 configured as a blind hole into which the lubricant necessary for bearing lubrication and planetary gear lubrication can be introduced. The individual planetary bolts 15 are also known to have at least one radial bore 17 which feeds into the mentioned axial bore 16 of the individual planetary bolts 15 and transports the lubricant introduced into the axial bore 16 radially outwardly and feeds it to the radial planetary gear bearing 13. The lubricant arrives finally via the radial planetary gear bearing 13 at the axial planetary gear bearing 14, that is, the thrust washers positioned usually on both sides of the individual planetary gears 12.

The planetary transmission shown as an example in FIG. 1 comprises, in addition, a component 20 adjacent to the planetary gear set 10 which does not have a relative speed with respect to the planetary carrier 11. In the examples shown here, this component 20 is configured as a shaft, which is connected in a rotationally fixed manner, via a toothed profile, to a hub of the planetary carrier 11. The shaft 20 has an axial bore 21 and at least one radial bore 22 that feeds into this axial bore 21 via which the lubricant required for lubrication of the planetary gear set 10 is guided from radially inside to the planetary gear set 10. The supply of lubricant is represented with dashed arrows in the drawing and identified with reference character A.

The planetary transmission shown as an example in FIG. 1 comprises in addition a first component identified with reference numeral 40 which is likewise adjacent to the planetary gear set 10 but can be rotated relative to the planetary carrier 11 and relative to the shaft 20. In the example that is shown, this first component 40 is configured as a cylinder-shaped hub having a particularly positive effect on the lubricant supply to the planetary gear set 10. This will be discussed later in further detail. The planetary transmission shown as an example in FIG. 1 comprises, in addition, a second component identified with reference numeral 50 which is adjacent to the planetary gear set 10 and is connected in a torque-proof manner to the first component 40 via a toothed profile and can be rotated accordingly likewise relative to the planetary carrier 11 and relative to the shaft 20. In the example that is shown, this second component 50 is configured as a sun gear with welded metal sheet and is allocated to a second planetary gear set of the planetary transmission. An axial bearing 51 arranged axially between the planetary carrier 11 and the sun gear 50 comprises a bearing washer 52 directly adjacent to the planetary carrier 11, an angle disk 55 directly adjacent to the sun gear 50, as well as rolling elements 51 arranged axially between the bearing washer 52 and the angle disk 55. The bearing washer 52 and the angle disk 55 of this axial bearing 51 have a special geometry which has a fundamental influence on the lubricant supply to the planetary bolts 15 of the planetary gear set 10 and which will be explained later in more detail.

As can be seen in FIG. 1, the lubricant supply A runs from the radial bore 22 of the shaft 20 axially between the bearing washer 52 and the angle disk 55 of the axial bearing 51, radially outward through the axial bearing 51, and arrives first in a ring-shaped chamber 31 of a lubricant catcher 30 which is positioned on the side of the planetary carrier 11 over approximately the reference diameter 15*a* of the planetary bolts 15. This lubricant catcher 30 is connected in a rotationally fixed manner to the planetary carrier 11 and is axially fixed via an apparatus—which is not shown in FIG. 1—on the planetary carrier 11. The lubricant catcher 30 has as many outlet pipes 32 in an axial extension as there are planetary bolts 15, whereby these outlet pipes 32 all feed into the ring-shaped chamber 31. The outlet pipes 32 of the lubricant catcher 30 are introduced into the axial bores 16 of the planetary bolts 15 when installed, so that the lubricant introduced radially from the interior into the ring-shaped chamber 31 can drain from the chamber 31 axially into the respective axial bore 16 of the planetary bolt 15 and move from there to the bearing 13, 14 of the planetary gears 12. It is advantageous to configure the transition between the outlet pipe 32 and the chamber 31 in a rounded shape to minimize the flow resistance. Depending on the tolerance situation and depending on the structural design of the cover between the outlet pipe 32 and the axial bore 15, the lubricant supply from the chamber into the axial bore 15 should have at least a very low leakage, whereby a seal can be provided in addition between the planetary bolt 15 and the lubricant catcher 30, in order to further reduce the leakage, for example, in the manner of an O-ring, which is arranged in a counterbore 18 of the planetary bolt 15.

Figure 2A:
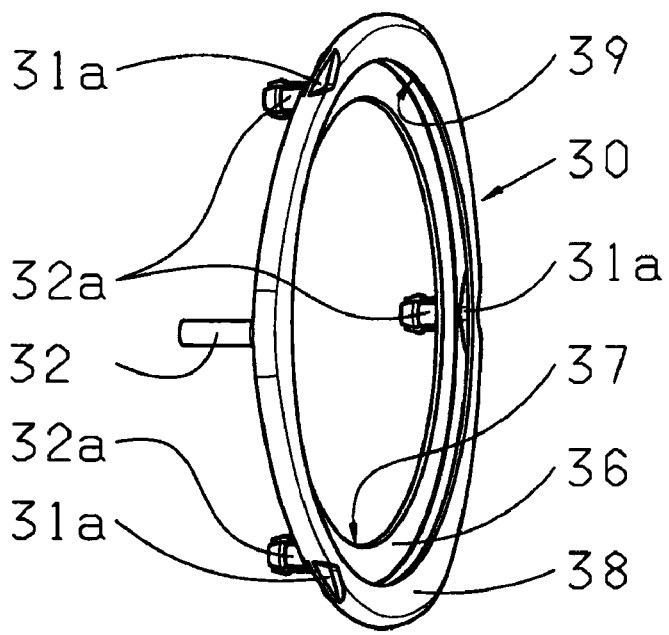
FIG. 2 shows an exemplary embodiment of a lubricant catcher of the planetary transmission of FIG. 1 (FIG. 2a shows a perspective view, FIG. 2b shows a plan view, and FIG. 2c shows a section)
Figures 2B, 2C:
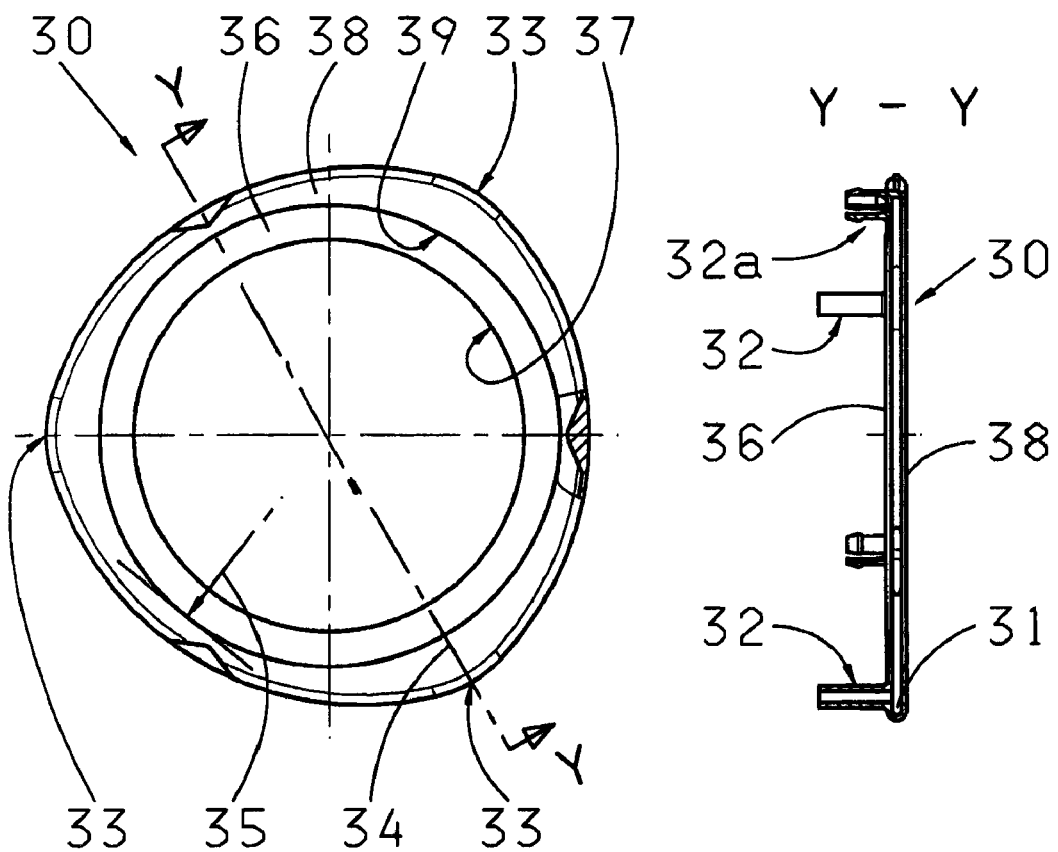

In FIG. 2, the lubricant catcher 30 is represented as a single piece which is shown in FIG. 2*a* in perspective view, in FIG. 2*b* in plan view, and in FIG. 2*c* in sectional view. The lubricant catcher 30 has a special hood-shaped outer contour in the region of the chamber 31, which has a decidedly positive influence on the uniform lubricant supply to the planetary gear bearing. The hood-shaped outer contour of the lubricant catcher 30 has thus as many radially outwardly directed oval protrusions 33 as there are planetary bolts 15. These oval protrusions 33 are provided with a special distribution in peripheral direction relative to the planetary bolts 15 of the planetary gear set 10. The oval protrusions 33 are arranged in such a way in peripheral direction, that the maximum radial extension 34 of the oval protrusions 33 is located near the planetary bolts 15, the minimum radial extension 35 of the oval protrusions 33 is located between the two adjacent planetary bolts 15, and the radial inner edge 16*a* of the axial bore 16 of the individual planetary bolts 15 is in a region located radially between the minimum and maximum radial extension 35, 34. The camber 31 is delimited by means of a cover plate 38 at its side that faces away from the planetary carrier 11 and by means of a gasket 36 at its side that faces toward the planetary carrier 11. The cover plate 38 that is farther from the planetary carrier preferably has at least an approximately circular inner diameter 39 which is smaller than the minimum radial extension 35 of the oval protrusions 33 of the lubricant catcher 30. The gasket 36 that is closer to the planetary carrier preferably has at least an approximately circular inner diameter 37 which is smaller than the inner diameter 39 of the cover plate 38 that is farther from the planetary carrier. A particularly efficient uniform lubricant supply into the axial bores 16 of all planetary bolts 15 is achieved at very low and very high speeds of the planetary carrier 11 by means of the sum of the individual structural details. The lubricant flowing in axially from inside is thus reliably prevented from draining past the planetary carrier 11 without having been used, and it is also prevented, that the lubricant available for lubrication of the planetary gear bearing 13, 14 is drawn off by a single planetary bolt 15.

The already previously mentioned axial fixation of the lubricant catcher 30 is identified with reference character 32*a* in FIG. 2*c* and is configured here, for example, as a clip. The outer recesses of the lubricant catcher 30 identified with 31*a* are [shown in] a production-related structural detail and serve for the production of uniform wall thicknesses in injection molding and are dependent on the tool utilized. Because of their special shape, it is particularly advantageous, if the lubricant catcher 30 according to the invention is at least for the most part made of plastic, for example, with an injection molding process. However, the lubricant catcher 30 can also be configured at least partially of rolled metal sheet.

Going back to FIG. 1, a special structural configuration of the axial bearing 51 provided axially between the planetary carrier 11 and the sun gear 50 will be discussed herein in more detail. As already mentioned, this axial bearing 51, seen in the flow direction of the lubricant fed to the planetary gear bearing 13, 14 of the planetary gear set 10, is arranged ahead of the ring-shaped chamber 31 of the lubricant catcher 30. As was also already mentioned, the axial bearing 51, through which the lubricant flows in radial direction, comprises a bearing washer 53 that is closer to the planetary carrier and an angle disk 55 that is farther from the planetary carrier, whereby the lubricant is guided radially outwardly axially between the bearing washer 53 and the angle disk 55.

With regard to the geometry of the bearing washer 53, it is essential, that the bearing washer 53 has an outer diameter 54, which is greater than the inner diameter 37 of the gasket 36 of the lubricant catcher 30 which is closer to the planetary carrier, and that the outer edge of the bearing washer 53 be arranged axially between the gasket 36 and the cover plate 38 of the lubricant catcher 30, as seen from a spatial point of view, and axially adjacent to the gasket 36 when installed, with a radial cover between the outer diameter 54 of the bearing washer 53 and the inner diameter 37 of the gasket 36 of the lubricant catcher 30. Backflushing of the lubricant catcher 30 on its side closer to the planetary carrier is thereby largely prevented.

With regard to the geometry of the angle disk 55, it is essential, that the angle disk 55 exhibits a transversely angled section 57 arranged radially above the rolling elements 52 of the axial bearing 51 and a plate-shaped section 58 radially attached to the transversely angled section 57, that the plate-shaped section 58 form the outer diameter 56 of the angle disk 55, that this outer diameter 56 be smaller than the inner diameter 39 of the cover plate 38 of the lubricant catcher 30, that the plate-shaped section 58 of the angle disk 55 be arranged axially between the gasket 36 and the cover plate 38 of the lubricant catcher 30, as seen from a spatial point of view, when installed, and that it be axially separated in such a way from the cover plate 38, that the axial distance between the gasket 36 and the plate-shaped section 58 of the angle disk 55 is smaller than the axial distance between the cover plate 38 and the plate-shaped section 58 of the angle disk 55. A bundling of the lubricant drops fed from radially inside is achieved by means of a comparatively small distance between the outer diameter 54 of the bearing washer 53 and the plate-shaped section 58 of the angle disk 55 in combination with the comparatively small axial distance between the plate-shaped section 58 of the angle disk 55 and the gasket 36 of the lubricant catcher 30 that is closer to the planetary carrier. Minimization of the amount of leakage draining through the axial gap 60 between the lubricant catcher 30 and the component 50 at both low and high speeds is achieved by means of the selected distance between the outer edge 56 of the angle disk 55 and the cover plate 38 of the lubricant catcher 30 farther from the planetary carrier in combination with the comparatively small axial distance between the plate-shaped section 58 of the angle disk 55 and the gasket 36 of the lubricant catcher 30 that is closer to the planetary carrier.

A particularly efficient and loss-free supply from the lubricant catcher 30 into the ring-shaped chamber 31 is thus achieved as an end result by means of this special geometric configuration of the bearing washer 53 and the angle disk 55.

Figure 3A:
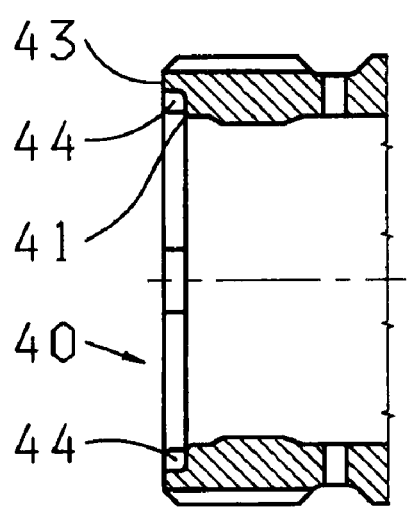
FIG. 3 shows an exemplary embodiment of a hub of the planetary transmission of FIG. 1 which can be rotated at a relative speed with respect to the planetary carrier (FIG. 3a shows a sectional view and FIG. 3b shows a plan view)
Figure 3B:
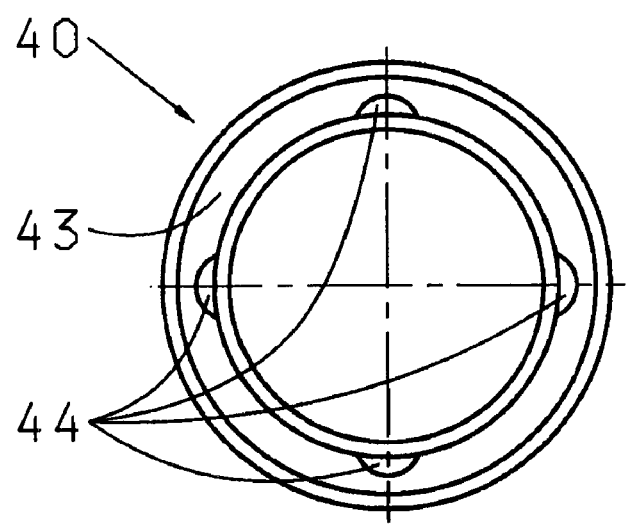

A special structural configuration of the cylinder-shaped hub 40 will be discussed in the following, which—as already mentioned—is adjacent to the planetary gear set 10 and can be rotated relative to the planetary carrier 11 of the planetary gear set 10 and relative to the shaft 20. This hub 40 is shown as a single piece in FIG. 3, in FIG. 2a as a sectional view and in FIG. 2b as a plan view. As can be seen in FIG. 1, a ring-shaped collection chamber 42 for the lubricant escaping from the radial bore 22 of the shaft 20 is provided before the axial bearing 51, seen in the direction of flow of the lubricant fed to the planetary gear bearing 13, 14 of the planetary gear set 10. Provided herein as a special structural characteristic is the cylinder-shaped hub 40 which can rotate at a relative speed with respect to the shaft 20, covers the radial bore 22 of the shaft 20 in axial direction and has a step 41 in the region of this axial cover at its inner diameter which forms the mentioned ring-shaped collection chamber 42 for collecting and distributing the lubricant fed from radially inside. The face 43 of the cylinder-shaped hub 40 that faces toward the planetary carrier 11 has in addition cage-shaped recesses 44 distributed over the inner diameter of their periphery in an axial extension in the region of the mentioned step 41 which all feed into the collection chamber 42 and swirl the lubricant fed into the collection chamber 42, when it is radially fed forward. This swirling of the lubricant improves the lubricant supply to the axial bearing 51 in particular at low or very high speeds.

Figure 4A:
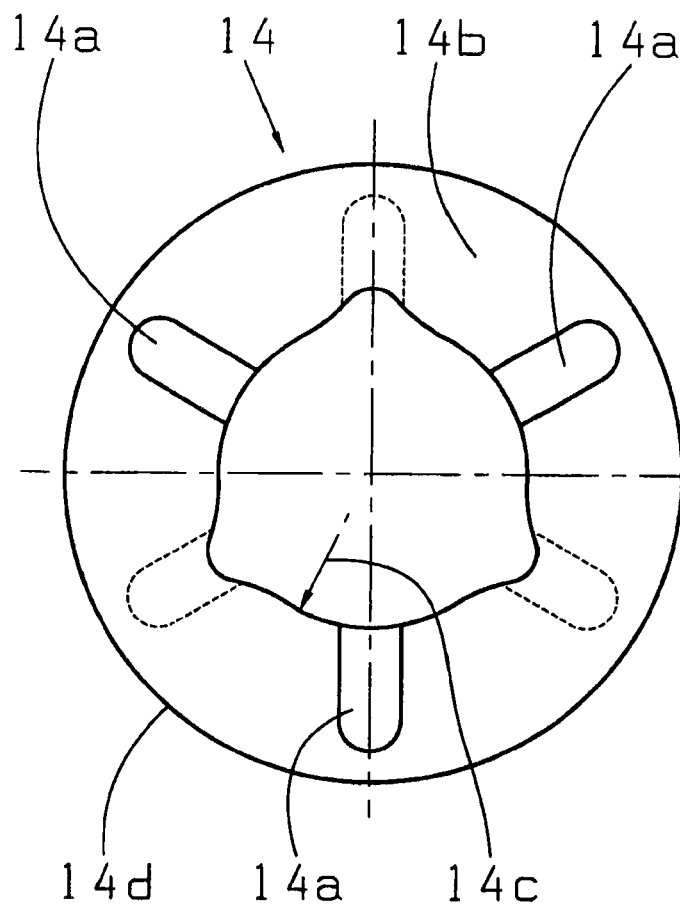
FIG. 4 shows an exemplary embodiment of an axial planetary bearing of the planetary transmission of FIG. 1 (FIG. 4a shows a plan view, FIG. 4b shows a section, and FIG. 4c shows a detail).
Figure 4B:
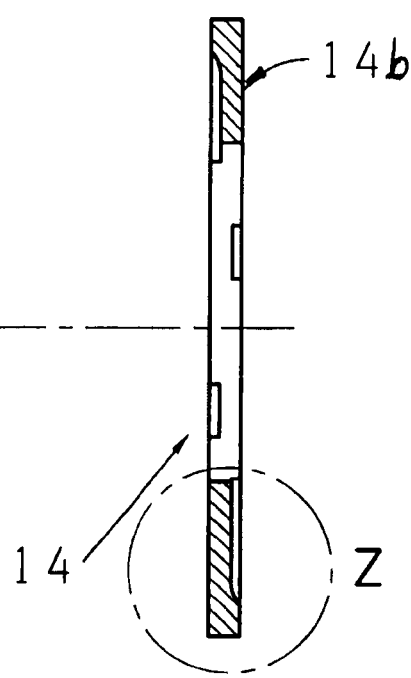
Figure 4C:
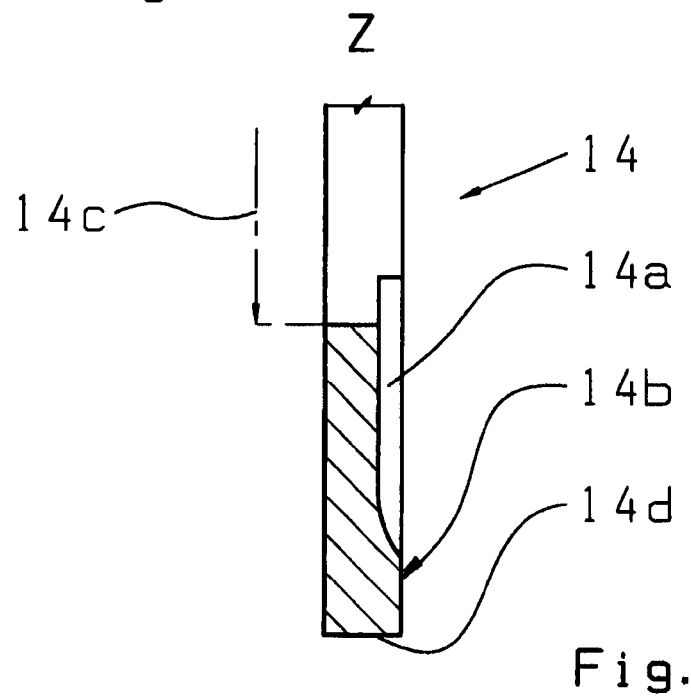

Another improvement of the lubrication of the planetary bearings of the planetary gear set 10 is possible by means of a special structural configuration of the axial planetary gear bearing 14, which is shown in FIG. 4. FIG. 4a shows a plan view, FIG. 4b shows a sectional view, and FIG. 4c shows a detail view of a thrust washer as exemplary embodiment of an axial planetary gear bearing 14 of the planetary transmission according to FIG. 1. The essential characteristics of this structural configuration are the lubricating pockets identified with reference character 14a arranged on the surface 14b of the thrust washer 14 which face toward the corresponding planetary gear (reference numeral 12 in FIG. 1). The number and peripheral circumferential pitch of the individual lubricating pockets 14a should be understood as an example. What is essential in the configuration of the lubricating pockets 14a is that they are open toward the inner diameter 14c of the thrust washer 14 with reference to the surface 14b seen in radial direction and closed toward the outer diameter 14d of the thrust washer 14, so that the lubricant fed via the radial planetary gear bearing (reference numeral 13 in FIG. 1) to the thrust washer 14 from radially inside cannot drain radially outward through a groove in a comparatively unimpeded manner, but is collected at least temporarily in the lubricating pockets 14a to form a lubricant film. In addition—as shown with dashes in FIG. 4a—lubricating pockets can also be arranged on the side of the thrust washer 14 which faces away from the respective planetary gear, whereby the thrust washer 14 is insensitive to a relative speed with respect to the planetary carrier 11. In order to ensure a lubricating oil supply in these lubricating pockets that are closer to the planetary carrier, it is practical to configure the inner contour of the thrust washer 14 in a shape that is not round, as is shown as an example in FIG. 4a.

REFERENCE CHARACTERS

A Lubricant supply
10 Planetary gear set
11 Planetary carrier of planetary gear set
12 Planetary gear of the planetary gear set
13 Radial planetary gear bearing
14 Axial planetary gear bearing, thrust washer
14a Lubricating pocket of thrust washer
14b Surface of the thrust washer that faces toward the planetary gear
14c Inner diameter of the thrust washer
14d Outer diameter of the thrust washer
15 Planetary bolt of planetary gear set
15a Reference diameter of the planetary bolt
16 Axial bore of the planetary bolt
16a Radial inner edge of the axial bore of the planetary bolt
17 Radial bore of the planetary bolt
18 Space of additional seal, counterbore of the planetary bolt
20 Component (shaft) without relative speed with respect to the planetary carrier adjacent to the planetary gear set
21 Axial bore of the component (or of the shaft)
22 Radial bore of the component (or of the shaft)
23 Synchronized gear tooth system between component (or shaft) and planetary carrier
30 Lubricant catcher
31 Ring-shaped chamber of lubricant catcher
31a Outer recess of the lubricant catcher
32 Outlet pipe of the lubricant catcher
33 Oval protrusion of the lubricant catcher aligned radially outward
34 Maximum radial extension of the oval protrusion
35 Minimum radial extension of the oval protrusion 36 Gasket of the lubricant catcher
37 Inner diameter of the gasket
38 Cover plate of the lubricant catcher
39 Inner diameter of the cover plate
40 First assembly adjacent to the planetary gear set with relative speed with respect to the planetary carrier, cylinder-shaped hub
41 Step of the assembly (or the hub) in the region of the axial cover
42 Ring-shaped collection chamber between assembly (or hub) and assembly (or shaft)
43 Face of the assembly (or the hub)
44 Cage-shaped recesses on the step of the assembly (or the hub)
50 Second assembly adjacent to the planetary gear set with relative speed with respect to the planetary carrier, sun gear with welded metal sheet
51 Axial bearing
52 Rolling element of axial bearing
53 Bearing washer of axial bearing
54 Outer diameter of bearing washer
55 Angle disk of axial bearing
56 Outer diameter of angle disk
57 Transversely angled section of the angle disk
58 Plate-shaped section of the angle disk
60 Axial gap between the lubricant catcher and metal sheet adjacent to the planetary gear set

The invention claimed is:

1. A planetary transmission, having at least one planetary gear set (10) with a planetary carrier (11) and planetary gears (12) rotatably mounted on planetary bolts (15), which are axially introduced into the planetary carrier (11), with a component (20) adjacent to the planetary gear set (10), which does not have a relative speed with respect to a planetary carrier (11) of the planetary gear set (10), as well as with a lubricating unit for supplying lubricant to the planetary gears (12) and bearings (13, 14), the lubricating unit comprises:

at least one radial bore (22) in the component (20) supplies the lubricant from radially inside the component (20);
a lubricant catcher (30) arranged on a side of the planetary carrier (11) directs the lubricant from the radial bore (22) of the component (20) axially into an axial bore (16) of the respective planetary gear bolt (15) and from there, via at least one radial bore (17) of the respective planetary bolt (15), to a radial bearing (13) of the respective planetary gears (12) and from there, via thrust washers (14) arranged on the left and right of the planetary gears (12), to a gear tooth system of the planetary gears (12);
the lubricant catcher (30) being connected to the planetary carrier (11) in a rotationally fixed manner;
the lubricant catcher (30) having a hood-shaped outer contour forming a ring-shaped chamber (31) on a side of the planetary carrier (11) over approximately a reference diameter (15a) of the planetary bolt (15), the ring-shaped chamber (31) being filled with the lubricant from radially inside;
the lubricant catcher (30) having an equal number of outlet pipes (32) in an axial extension as the planetary bolts (15), the outlet pipes (32) extend axially from the ring-shaped chamber (31) of the lubricant catcher (30) to axial bores (16) of the planetary bolts (15), when they are installed to direct the lubricant from the lubricant catcher;
the hood-shaped outer contour comprises exactly as many radially, outwardly directed oval protrusions (33) as there are planetary bolts (15), the oval protrusions (33) are arranged in the circular pitch of the planetary bolts (15), as seen from a spatial point of view, such that a maximum radial dimension (34) of the oval protrusions (33) is arranged near the planetary bolt (15), and a minimum radial extension (35) of the oval protrusions (33) being arranged between two adjacent planetary bolts (15), a radial inner edge (16a) of the axial bore (16) of the planetary bolts (15) is in a region located radially between the minimum and the maximum radial dimensions (34, 35) of the respective oval protrusion (33) of the lubricant catcher wherein the entire hood shaped outer contour is convex (30);
the ring-shaped chamber (31) of the lubricant catcher (30) being delimited, on a side facing away from the planetary carrier (11), by a cover plate (38) with an at least approximately circular inner diameter (39) which is smaller than the minimum radial extension (35) of the oval protrusions (33) of the lubricant catcher (30); and
the ring-shaped chamber (31) of the lubricant catcher (30) being delimited at an opposite side facing toward the planetary carrier (11) by a gasket (36) having a circular inner diameter (37) which is smaller than the inner diameter (39) of the cover plate (38) of the lubricant catcher (30).

2. The planetary transmission according to claim 1, wherein an axial bearing (51) is arranged in direction of flow of the lubricant between the radial bore (22) of the component (20) adjacent the planetary gear set (10), which does not have a relative speed with respect to the planetary carrier (11) of the planetary gear set (10), and the lubricant catcher (30), viewed from a spatial point of view, the axial bearing (51) is located radially below the lubricant catcher (30) and axially between the planetary carrier (11) and an assembly (50) adjacent the planetary carrier (11) which is rotatable at a relative speed with respect to the planetary carrier (11);

the axial bearing (51) has a bearing washer (53) on a side facing toward the planetary carrier (11) with an outer diameter (54) greater than the inner diameter (37) of the gasket (36) of the lubricant catcher (30);
an outer edge of the bearing washer (53) formed by the outer diameter (54) of the bearing washer (53) is axially arranged when installed, viewed from a spatial point of view, between the gasket (36) and the cover plate (38) of the lubricant catcher (30) in an axial proximity to the gasket (36), with a radial cover between the outer diameter (54) of the bearing washer (53) and the inner diameter (37) of the gasket (36) of the lubricant catcher (30);
the axial bearing (51) has an angle disk (55) with a radial section (57) angled transversely to and arranged above rolling elements (52) of the axial bearing (51) on a side facing away from the planetary carrier (11) and a plate-shaped section (58) that attaches to the transversely angled section (57), the plate-shaped section (58) of the angle disk (55) constitutes an outer diameter (56) of the angle disk (55) which is smaller than the inner diameter (39) of the cover plate (38) of the lubricant catcher (30);
the plate-shaped section (58) of the angle disk (55) is arranged axially between the gasket (36) and the cover plate (38) of the lubricant catcher (30) when installed, as seen from a spatial point of view, and is arranged axially at a distance from the cover plate (38) such that an axial distance between the gasket (36) and the plate-shaped section (58) of the angle disk (55) is smaller than an axial distance between the cover plate (38) and the disk-shaped section (58) of the angle disk (55); and
the lubricant is directed axially between the bearing washer (53) and the angle disk (55) and radially through the axial bearing (51).

3. The planetary transmission according to claim 2, wherein a cylinder-shaped assembly (40), which is adjacent to the planetary carrier (11) and rotatable at a relative speed with respect to the planetary carrier (11), is arranged in the direction of flow of the lubricant between the radial bore (22) of the component (20) adjacent to the planetary gear set (10), which does not have a relative speed with respect to the planetary carrier (11) of the planetary gear set (10), and the axial bearing (51);

the cylinder-shaped assembly (40) is located radially above the radial bore (22) of the component (20) in an axial direction and has a step (41) on an inner diameter in a region of an axial cover which forms a ring-shaped collection chamber (42) for collecting and distributing the lubricant directed radially from inside; and the cylinder-shaped assembly (40) has cage-shaped recesses (44) in a region of the step (41) in an axial extension that are positioned about a inner diameter the cylinder-shaped assembly (40) on a face of the cylinder-shaped assembly (40) that faces the planetary carrier (11), and the recesses (44) direct the lubricant into the collection chamber (42) and swirl the lubricant directed into the collection chamber (42), when the lubricant is radially conducted onward.

4. The planetary transmission according to claim 1, wherein the lubricant catcher (30) is primarily made of plastic.

5. The planetary transmission according to claim 1, wherein the lubricant catcher (30) is at least partially made of rolled sheet metal.

6. A planetary transmission, having at least one planetary gear set (10) with a planetary carrier (11) and planetary gears (12) rotatably mounted on planetary bolts (15), which are axially introduced into the planetary carrier (11), with a component (20) adjacent to the planetary gear set (10), which does not have a relative speed with respect to a planetary carrier (11) of the planetary gear set (10), as well as with a lubricating unit for supplying lubricant to the planetary gears (12) and bearings (13, 14), the lubricating unit comprises:

at least one radial bore (22) in the component (20) supplies the lubricant from radially inside the component (20);

a lubricant catcher (30) arranged on a side of the planetary carrier (11) directs the lubricant from the radial bore (22) of the component (20) axially into an axial bore (16) of the respective planetary gear bolt (15) and from there, via at least one radial bore (17) of the respective planetary bolt (15), to a radial bearing (13) of the respective planetary gears (12) and from there, via thrust washers (14) arranged on the left and right of the planetary gears (12), to a gear tooth system of the planetary gears (12);

the lubricant catcher (30) being connected to the planetary carrier (11) in a rotationally fixed manner, such that both the lubricant catcher (30) and the planetary carrier (11) rotate concentrically about a rotational axis;

the lubricant catcher (30) having a hood-shaped outer contour forming a ring-shaped chamber (31) on a side of the planetary carrier (11) over approximately a reference diameter (15a) of the planetary bolt (15), the ring-shaped chamber (31) being filled with the lubricant from radially inside;

the lubricant catcher (30) having an equal number of outlet pipes (32) in an axial extension as the planetary bolts (15), the outlet pipes (32) extend axially from the ring-shaped chamber (31) of the lubricant catcher (30) to axial bores (16) of the planetary bolts (15), when they are installed to direct the lubricant from the lubricant catcher;

the hood-shaped outer contour comprising radially extending oval protrusions (33) and radial depressions, the number of the oval protrusions (33) being equal to the number of the planetary bolts (15), the oval protrusions (33) and the radial depressions being alternately arranged and equally spaced on the lubricant catcher (30) about the rotational axis of the lubricant catcher (30), the oval protrusions (33) and the planetary bolts (15) being aligned along maximum radial dimensions (34) of the lubricant catcher (30), the maximum radial dimensions (34) defining maximum a distance from the rotational axis to the hood-shaped outer contour, the radial depressions being aligned at minimum radial dimensions of the lubricant catcher (30), the minimum radial dimensions defining a minimum distance from the rotational axis to the hood-shaped outer contour, the oval protrusions (33) being arranged diametrically opposite the minimum radial dimensions of the lubricant catcher (30);

the ring-shaped chamber (31) of the lubricant catcher (30) being delimited, on an axial side facing away from the planetary carrier (11), by a cover plate (38) with an at least approximately circular inner diameter (39) which is smaller than a minimum radial extension (35) of the oval protrusions (33) of the lubricant catcher (30); and the ring-shaped chamber (31) of the lubricant catcher (30) being delimited at an opposite axial side facing toward the planetary carrier (11) by a gasket (36) having a circular inner diameter (37) which is smaller than the inner diameter (39) of the cover plate (38) of the lubricant catcher (30).

7. The planetary transmission according to claim 6, wherein an axial bearing (51) is arranged in direction of flow of the lubricant between the radial bore (22) of the component (20) adjacent the planetary gear set (10), which does not have a relative speed with respect to the planetary carrier (11) of the planetary gear set (10), and the lubricant catcher (30), viewed from a spatial point of view, the axial bearing (51) is located radially below the lubricant catcher (30) and axially between the planetary carrier (11) and an assembly (50) adjacent the planetary carrier (11) which is rotatable at a relative speed with respect to the planetary carrier (11);

the axial bearing (51) has a bearing washer (53) on a side facing toward the planetary carrier (11) with an outer diameter (54) greater than the inner diameter (37) of the gasket (36) of the lubricant catcher (30);

an outer edge of the bearing washer (53) formed by the outer diameter (54) of the bearing washer (53) is axially arranged when installed, viewed from a spatial point of view, between the gasket (36) and the cover plate (38) of the lubricant catcher (30) in an axial proximity to the gasket (36), with a radial cover between the outer diameter (54) of the bearing washer (53) and the inner diameter (37) of the gasket (36) of the lubricant catcher (30);

the axial bearing (51) has an angle disk (55) with a radial section (57) angled transversely to and arranged above rolling elements (52) of the axial bearing (51) on a side facing away from the planetary carrier (11) and a plate-shaped section (58) that attaches to the transversely angled section (57), the plate-shaped section (58) of the angle disk (55) constitutes an outer diameter (56) of the angle disk (55) which is smaller than the inner diameter (39) of the cover plate (38) of the lubricant catcher (30);

the plate-shaped section (58) of the angle disk (55) is arranged axially between the gasket (36) and the cover plate (38) of the lubricant catcher (30) when installed, as seen from a spatial point of view, and is arranged axially at a distance from the cover plate (38) such that an axial distance between the gasket (36) and the plate-shaped section (58) of the angle disk (55) is smaller than an axial distance between the cover plate (38) and the disk-shaped section (58) of the angle disk (55); and the lubricant is directed axially between the bearing washer (53) and the angle disk (55) and radially through the axial bearing (51).

8. The planetary transmission according to claim 6, wherein a cylinder-shaped assembly (40), which is adjacent to the planetary carrier (11) and rotatable at a relative speed with respect to the planetary carrier (11), is arranged in the direction of flow of the lubricant between the radial bore (22) of the component (20) adjacent to the planetary gear set (10), which does not have a relative speed with respect to the planetary carrier (11) of the planetary gear set (10), and the axial bearing (51);

the cylinder-shaped assembly (40) is located radially above the radial bore (22) of the component (20) in an axial direction and has a step (41) on an inner diameter in a region of an axial cover which forms a ring-shaped collection chamber (42) for collecting and distributing the lubricant directed radially from inside; and the cylinder-shaped assembly (40) has cage-shaped recesses (44) in a region of the step (41) in an axial extension that are positioned about a inner diameter the cylinder-shaped assembly (40) on a face of the cylinder-shaped assembly (40) that faces the planetary carrier (11), and the recesses (44) direct the lubricant into the collection chamber (42) and swirl the lubricant directed into the collection chamber (42), when the lubricant is radially conducted onward.

9. The planetary transmission according to claim 6, wherein the entire hood-shaped outer contour is convex.

* * * * *